(12) United States Patent
Klingauf et al.

(10) Patent No.: US 6,969,089 B2
(45) Date of Patent: Nov. 29, 2005

(54) SEAT BELT FORCE LIMITER

(75) Inventors: Gerhard Klingauf, Balzheim (DE); Andreas Maunz, Ulm (DE); Norbert Wahl, Weilheim (DE); Oliver Glinka, Ulm (DE); Wolfgang Schrade, Blaustein (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 0 days.

(21) Appl. No.: 10/893,224

(22) Filed: Jul. 19, 2004

(65) Prior Publication Data

US 2004/0256511 A1    Dec. 23, 2004

Related U.S. Application Data

(62) Division of application No. 10/026,962, filed on Dec. 27, 2001.

(30) Foreign Application Priority Data

Dec. 28, 2000   (DE) ................................ 100 65 509

(51) Int. Cl.⁷ .......................... B60R 22/28; B60R 22/36
(52) U.S. Cl. .................. 280/805; 280/806; 242/379.1; 297/472
(58) Field of Search ................................ 280/805, 806, 280/807; 242/379.1; 297/470, 471, 472, 297/478

(56) References Cited

U.S. PATENT DOCUMENTS

| | | | |
|---|---|---|---|
| 4,564,155 A | 1/1986 | Tsukamoto | |
| 5,333,906 A | 8/1994 | Fujimura et al. | |
| 5,664,807 A | 9/1997 | Bohmler | |
| 6,105,894 A * | 8/2000 | Singer et al. | ............. 242/379.1 |
| 6,206,315 B1 | 3/2001 | Wier | |
| 6,290,159 B1 | 9/2001 | Specht et al. | |
| 6,416,008 B1 * | 7/2002 | Fujii et al. | ................... 280/806 |
| 6,481,660 B2 * | 11/2002 | Nagata et al. | ............... 280/805 |

FOREIGN PATENT DOCUMENTS

| | | |
|---|---|---|
| DE | 195 17 440 A1 | 11/1995 |
| DE | 195 11 457 A1 | 10/1996 |
| DE | 195 13 724 A1 | 10/1996 |
| DE | 195 44 783 A1 | 6/1997 |
| DE | 299 06 629 U1 | 10/1999 |
| DE | 199 02 483 A1 | 8/2000 |
| DE | 199 27 731 A1 | 12/2000 |
| EP | 1 060 962 A2 | 12/2000 |
| EP | 1 149 743 A2 | 10/2001 |
| JP | 10035411 A * | 2/1998 ........... B60R 22/28 |
| WO | WO 00/71394 A1 | 11/2000 |

* cited by examiner

*Primary Examiner*—Peter C. English
(74) *Attorney, Agent, or Firm*—Foley & Lardner LLP

(57) ABSTRACT

A belt force limiter which limits the belt force through the twisting of a torsion bar. The belt force limiter includes a flange, a reel for winding and unwinding the belt, as well as the torsion bar. Additionally, a shear pin or a deformable pin may be provided for locking the flange and the reel together, so that the relative turning of the flange and reel is prevented or impeded until the tensile force acting on the belt exceeds a preset level momentarily or over a preset period of time. Thus the force limitation is delayed or graduated. Furthermore, in a method for reducing the danger of injury to a vehicle's occupant by means of a restraining system the belt force is allowed to increase to an elevated level of force and then the belt force diminishes again before the belt force limitation begins.

5 Claims, 14 Drawing Sheets

Belt Force

Belt Extraction Length

SEAT BELT FORCE LIMITER

CROSS REFERENCE TO RELATED APPLICATIONS

The present application is a divisional application of U.S. patent application Ser. No. 10/026,962, filed Dec. 27, 2001 which claims priority to and the benefit of German Application No. 10065509.2, filed Dec. 28, 2000. The foregoing applications are incorporated herein by reference in their entirety.

BACKGROUND

The invention relates to a seat belt force limiter and a method for restraining an occupant of a vehicle.

In particular, and not exclusively, the present invention relates to the reduction of the danger of injury to vehicle occupant by means of a restraining system having a crash sensor, a three-point safety seat belt and an apparatus for limiting the seat belt force.

In the state of the art it is known to protect vehicle occupant in case of an accident by means of a three-point safety belt; when the crash sensor is triggered, first a belt tensioner is activated, and after the belt is tightened and the belt spool is clutched, a device for energy absorption is activated which limits the belt forces acting on the vehicle's occupant.

Belt force limiters are known in which the belt force limitation is achieved in principle by the rotation of a torsion bar. Such belt force limiters generally have a flange, a spool for winding and unwinding the belt, and a torsion bar. In case of an accident the flange is antitorsibly locked and connected by means of a locking device to the vehicle's structure, while the belt wound on the spool can unwind with a limited force resulting from the torque of the torsion bar.

Also, two-stage belt force limiters have been proposed wherein the belt force level is reduced in a second, additional stage. Embodiments heretofore, however, are very complicated and too expensive.

SUMMARY

The present invention is addressed to the problem of creating a two-stage seat belt force limiter which offers a reliable limitation of belt force for very little manufacturing expense.

According to the invention, a belt force limiter for a vehicle is created having a rotatable spool for winding and unwinding a belt, a torsion bar which is connected to the spool on the one hand and on the other hand is rotatably attached to the vehicle, a locking device for blocking the torsion bar's ability to twist, and a pin for releasably inhibiting the rotation of the spool.

In particular, the belt force limiter can have a flange joined to the spool, which can rotate with and relative to the spool, the torsion bar being joined on the one hand to the spool and on the other hand to the flange, as well as a locking device for blocking rotation of the flange, the pin being designed for a removable restraint of the rotation of the flange relative to the spool.

The term, "restraint," is to be understood as a blocking or an impediment of the rotation of the flange relative to the spool. This restraint can be removed, so that after its removal the rotation of the flange relative to the spool is controlled by the torsion bar. Thus, a two-stage force limitation can be achieved with simple means.

The consistency of the pin can be such that its restraint of the spool can be removed by the application of a predetermined torque with simultaneous blocking of the rotation of the flange. Thus the first stage of force limitation produced by the pin is replaced after the predetermined torque is exceeded, by a second, preferably slighter force limitation, determined by the torsion bar.

In one embodiment, the pin is a shear pin which is so configured that when a predetermined torque is acting on the spool and the rotation of the flange is simultaneously blocked it shears off, so that the inhibition of the rotation of the flange relative to the spool is removable. By means of the shear pin which blocks the force limiting action provided by the torsion bar, then shears off and thereby releases the force limiting action, the requirements of the standard referred to in the beginning can be satisfied while at the same time providing optimum protection of the occupant against injury.

Especially in regard to this standard, the consistency of the shear pin can be selected such that the predetermined torque corresponds to a belt force acting on the belt of at least 6672 N. Thus, a belt extension of (the prescribed) 508 mm can be prevented before a belt force of 6672 N is reached. On the other hand, the belt force applied to the vehicle's occupant after the shear pin has sheared off is at a level that is optimum for protecting the occupant against injury.

By using various materials in the shear pin the shear force can be adapted to the existing belt angle and spool diameter which determine the effective radius of the application of force, so that the load limit is reliably reached at the specified belt extraction length.

In an alternative embodiment the pin is configured such that its restraint of the spool can be removed by applying a predetermined torque throughout a predetermined belt extension while simultaneously blocking the flange rotation. In this embodiment the changeover to the force limitation determined by the torsion bar does not occur until after such a length of the belt is extended. In this manner also, a two-stage force limitation is created with simple means.

In particular, the pin can be constituted by a bendable deformation pin and the flange can have a slot leading into the cavity, while the application of a predetermined steady force to the spool can initiate a rotation of the spool relative to the flange, so that the deformation pin is forced into the slot causing it to bend and to be extracted from the cavity and the restraint of the rotation of the flange relative to the spool can be removed. This embodiment can be manufactured especially easily, so that the costs of the belt force limiter can be kept low. Also, an upgrading of an already manufactured belt force limiter is possible.

The slot runs preferably perpendicular to and in a substantially semicircular course around the axis of rotation of the flange. Moreover, the slot runs preferably in the flange surface that faces the spool. It is also possible by the length and course of the slot to determine what length of the deformation pin can have. The length of the deformation pin can also be used to adjust the duration of the initial force limiting action.

In one embodiment the spool and the flange have a cavity running lengthwise substantially parallel to its axis of rotation to accommodate the pin. This feature also promotes the ease of manufacture of the belt force limiter and permits an upgrading of already manufactured belt force limiters.

According to the invention, furthermore, a belt force limiter is created, having: a rotatable spool for winding and unwinding a belt; a torsion bar which is attached on the one hand to the spool and rotatably on the other hand to the vehicle; a locking device for locking the torsion bar against rotation, and a clutch for the releasable blocking of a rotation of the reel.

Accordingly, in case of an accident, rotation of the belt spool is initially blocked by means of a clutch. After a short time the clutch is disengaged and the belt spool is free to rotate. The rotation of the belt spool is determined from then on by the torsion bar. Thus a two-stage belt force limitation is achieved.

Advantageously, by means of the clutch a positive connection is produced between the spool and the vehicle. By this is meant that the spool is connected directly or indirectly to the vehicle as the result of a positive coupling by the clutch, i.e., to a portion of the vehicle which prevents any rotation of the spool at least in the direction of the unwinding of the belt.

Advantageously, the positive connection is produced simply by friction. This can be achieved by the fact that the clutch has a guiding ring which can rotate relative to the spool, with at least one guiding slot and a clutching means guided for movement therein, the clutching means being able to be shifted from a rest position to a locking position by the rotation of the guiding ring, and in that position any rotation of the spool is blocked.

In particular, the at least one clutching means can have an outwardly facing clutching surface which engages the spool by shifting to its clutching position. Thus a positive connection can be produced or released between the spool and the vehicle in an especially simple manner.

According to the invention, a belt device is created for a vehicle, having: a belt force limiter with a rotatable spool for winding and unwinding a belt, a torsion bar which is fastened on the one hand to the spool and on the other hand is mounted for rotation on the vehicle, a locking device for blocking the twisting of the torsion bar, and a clutch for the releasable locking of the rotation of the spool; and a belt tightener with a drive shaft connected with the clutch, the spool being rotated and the belt being wound up by the rotation of the drive shaft and thus tightened. The set belt device according to the invention advantageously combines a belt tightener with a belt force limiter.

In particular, the clutch can have a guiding ring that can rotate relative to the spool, with at least one guiding slot and a clutching element guided for movement therein, the clutching element being able to be shifted from a rest position to a clutching position in which rotation of the spool is blocked. Thus the rotation of the spool can be achieved in a simple mechanical manner.

Preferably the clutching elements are articulated on a connecting element, the connecting element being connected to the guiding ring and the drive shaft. In particular, the connecting element can be connected to the guiding ring at the center point of the latter, and the connection of the center point area to the outer area of the guiding ring in which the at least one guiding slot runs can be resilient, so that rotation of the drive shaft produces a rotation of the center area relative to the outside area, so that the clutching element in the guiding slot can be changed to the clutching position.

Moreover, the guiding ring preferably has locking elements, and when the belt unwinds and the spool connected with it rotates a rotation of the guiding ring, an engagement of the locking elements with the vehicle, a blocking of the rotation of the guiding ring, and a changeover of the clutching elements from the clutching position to the position of rest can be accomplished.

Thus, by the rotation of the drive shaft of the belt tightener, a tensional connection can be produced between the drive shaft and the spool. This connection continues until the rotation of the drive shaft ends and the belt is wound up slightly and thus tightened. Then the force which is exerted on the belt by the vehicle occupant plunging against the belt in the event of an accident produces a change in the sense of rotation of the spool. This force is transferred to the guiding ring, so that the latter rotates with the spool. After a short rotation the blocking elements of the guiding ring engage the vehicle and prevent any further rotation. Thus the belt force increases to a higher level. If the belt force reaches a predetermined level, that at least one clutching element is released from the positive contact with the spool and forced to the rest position in the guiding slot. After that the spool can rotate relative to the guiding ring. The rotation of the spool is now determined by the torsion bar.

According to the invention, a method is furthermore created for reducing the danger of injury to a vehicle occupant by means of a restraining system having a crash sensor, a three-point safety belt and a system for limiting belt force, wherein in case of an accident, directly after detection of an accident by the crash sensor, first a rapid and brief increase of the belt force to a higher level is allowed, which is above the level of force which the system for belt force limitation assumes when belt force limitation begins, and then the belt force is reduced from the elevated force level before the belt force limiting process starts.

This method solves the above-stated problem especially because, in case of an accident, immediately after detection of the accident by the crash sensor, at first a rapid and brief rise in the belt force to an elevated force level is allowed, which is above the force level which the apparatus for belt force limitation assumes when belt force limiting begins, and then the belt force is lowered from the elevated force level before the process of belt force limitation starts.

Therefore a time-defined and brief increase of the belt force to an elevated force level is permitted, which is above the force level when the belt force limitation is beginning, for example above a force level of about 4.5 kN. Thus the danger of injury to a vehicle occupant is definitely reduced, since it has developed surprisingly that an earlier and brief rise in the belt force above an elevated force level of about 4.5 kN is extremely advantageous. Since immediately after activation by the crash sensor the relative vehicle-to-occupant velocity is relatively low, the vehicle occupant is exposed only to low stress levels even when the belt force is at an elevated force level. Otherwise—at this low stress—the vehicle occupant is rapidly subjected to the maximum force level of the device for the limitation of belt force. Thus, according to the invention, the maximum belt force to which the vehicle occupant is exposed is intentionally shifted to a very early point in time. The stresses acting on the vehicle occupant are more reduced than in the case of the use of a conventional system for limiting belt force, which has an energy-absorbing element.

Preferably, the elevated level of force is above approximately 4.5 kN, especially ranging from about 6 to 9 kN. The level of force which the device for belt force limitation assumes as belt force limitation begins can range from about 4 to 5 kN.

It is especially advantageous if the brief and rapid increase of the belt force to a high level occurs very early, i.e., about 25 to 35 ms after the crash sensor responds, and if this rise in the belt force persists for about 5 to 15 ms. It is also advantageous if the rise of the belt force is joined by a tightening action, i.e., a tightening of the belt by means of a belt tightener.

The rising of the belt tightener to the elevated level of force can be initiated, for example, by the shearing of shear pins provided near a belt winder. The belt force can be lowered before the belt force limitation begins, by the release of frictional elements engaged with one another. Likewise it is advantageous to bring about the raising and lowering of the belt force by a clutch that opens under load and closes. In this case the deliberate increase of the belt force is caused by the fact that an additional force must be applied to open the clutch under load. After the clutch has been fully released, the belt force decreases again, preferably to the level of the belt force limiter.

To control the belt force limitation in the second stage, a torsion bar can be used in a known manner, in which is twisted by the force acting on the belt and thereby dissipates energy. In this case the belt force can be lowered to the level of force that corresponds to that of the torsion bar.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
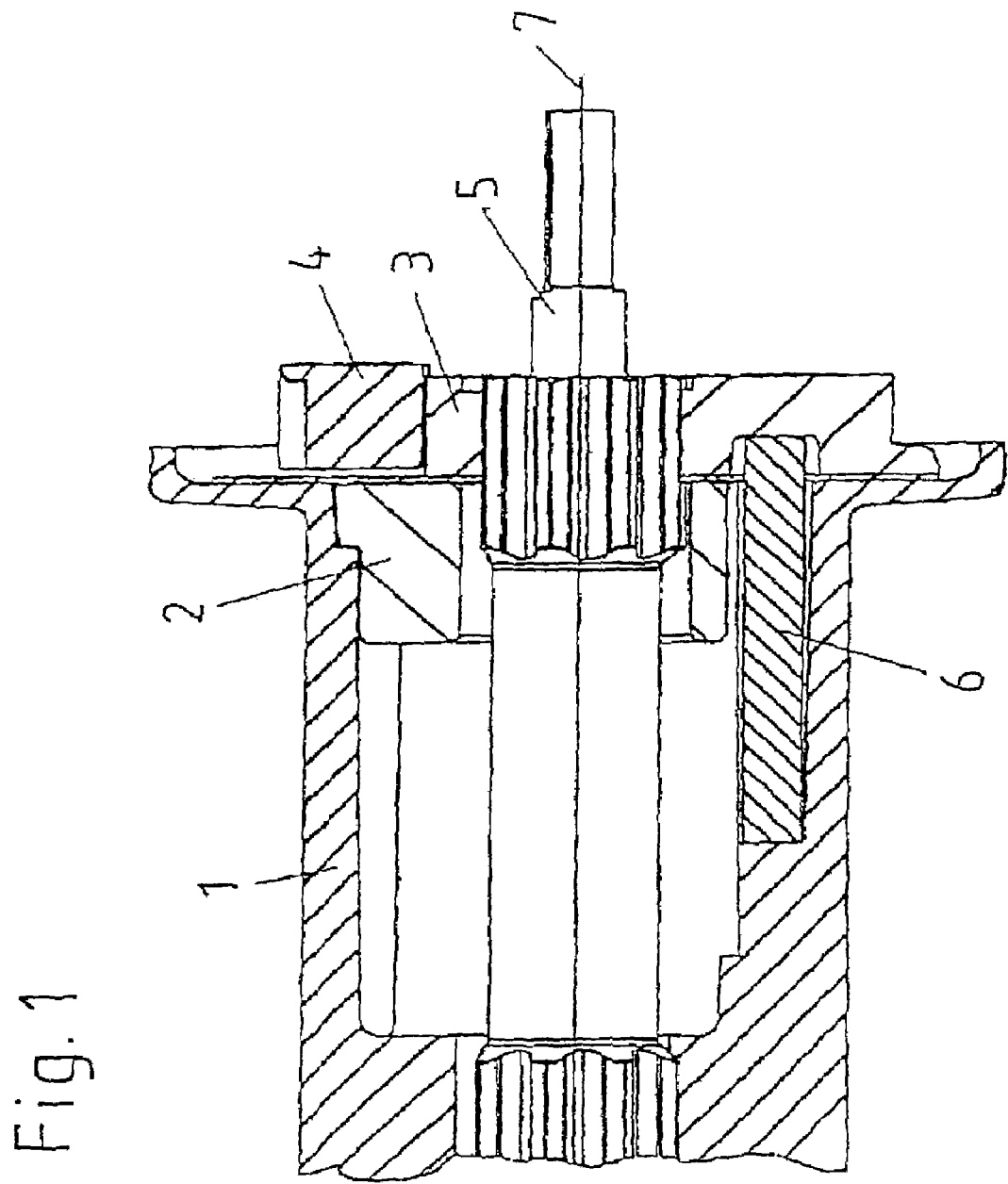
FIG. 1 shows a cross section through a belt force limiter according to a first embodiment of the invention.
Figure 2:
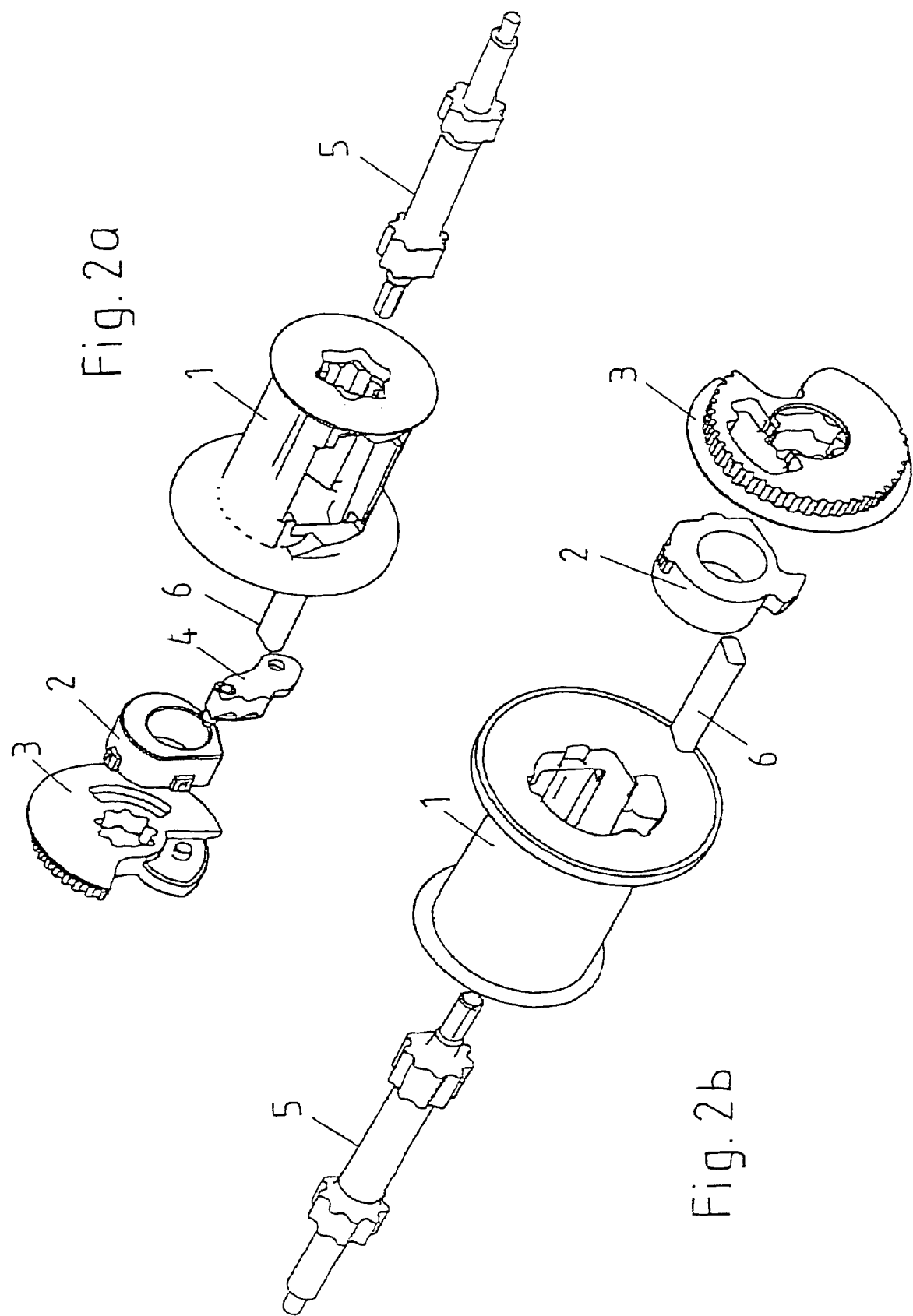
FIG. 2a is a rear perspective view of the parts of the belt force limiter from FIG. 1
FIG. 2b is a front perspective view of the parts of the belt force limiter from FIG. 1.

FIG. 1 shows schematically the cross section of a force limiter for a seat belt system according to a first embodiment of the invention. FIGS. 2a and 2b show the individual parts of the limiter in a perspective view. The force limiter comprises a rotatable spool 1 with a spool bearing 2, on which a seat belt, not shown, can be wound and unwound. At the one end of the spool 1 along its axis of rotation there is a flange 3 which can rotate relative to the spool. Furthermore, a pawl 4 is provided which locks up the flange 3 in the event of an accident.

Also, a torsion bar 5 is provided which has a gear at both ends, by means of which the torsion bar 5 is anchored against rotation in corresponding openings in the spool 1 and flange 3. The torsion bar 5 locks the spool 1 and flange 3 to one another, so that when the limiter is in the state of rest (i.e., in the absence of an accident) the spool 1 and the flange 3 can rotate together about an axis 7 in order to wind the belt on the spool 1 or unwind it therefrom.

The two ends of the torsion bar 5 can be turned relative to one another. This property is utilized to achieve a belt force limiting action.

The limiter furthermore has a shear pin 6 which runs parallel to the torsion bar and is received in respective cavities in the spool 1 and flange 3. Up to a threshold determined by its stability the shear pin 6 prevents any turning of the spool 1 and flange 3 relative to one another.

In the event of an accident, the pawl 4 anchors the flange 3 and thus the one end of the torsion bar 5 to the frame of the belt system. Since the flange 3 is positively joined to the spool 1, the spool 1 is also anchored to the frame of the belt system. Now a torque caused by the vehicle's occupant plunging into the belt acts upon the spool.

In the absence of the shear pin 6, the torsion bar 5 would twist in accordance with this torque, the belt would be further unwound, and as a consequence the belt force acting on the vehicle's occupant would be reduced. The shear pin 6, however, initially prevents the rotation of the spool 1 and flange 3 relative to one another and thus prevents activation of the belt force limiter. Not until the torque exceeds a predetermined value, which is dependent upon the selected stability of the shear pin 6, the shear pin 6 shears off, so that the positive coupling between the spool 1 and the flange 3 is released. Thereafter a limitation of force takes place as at the beginning of this paragraph.

Figure 3:
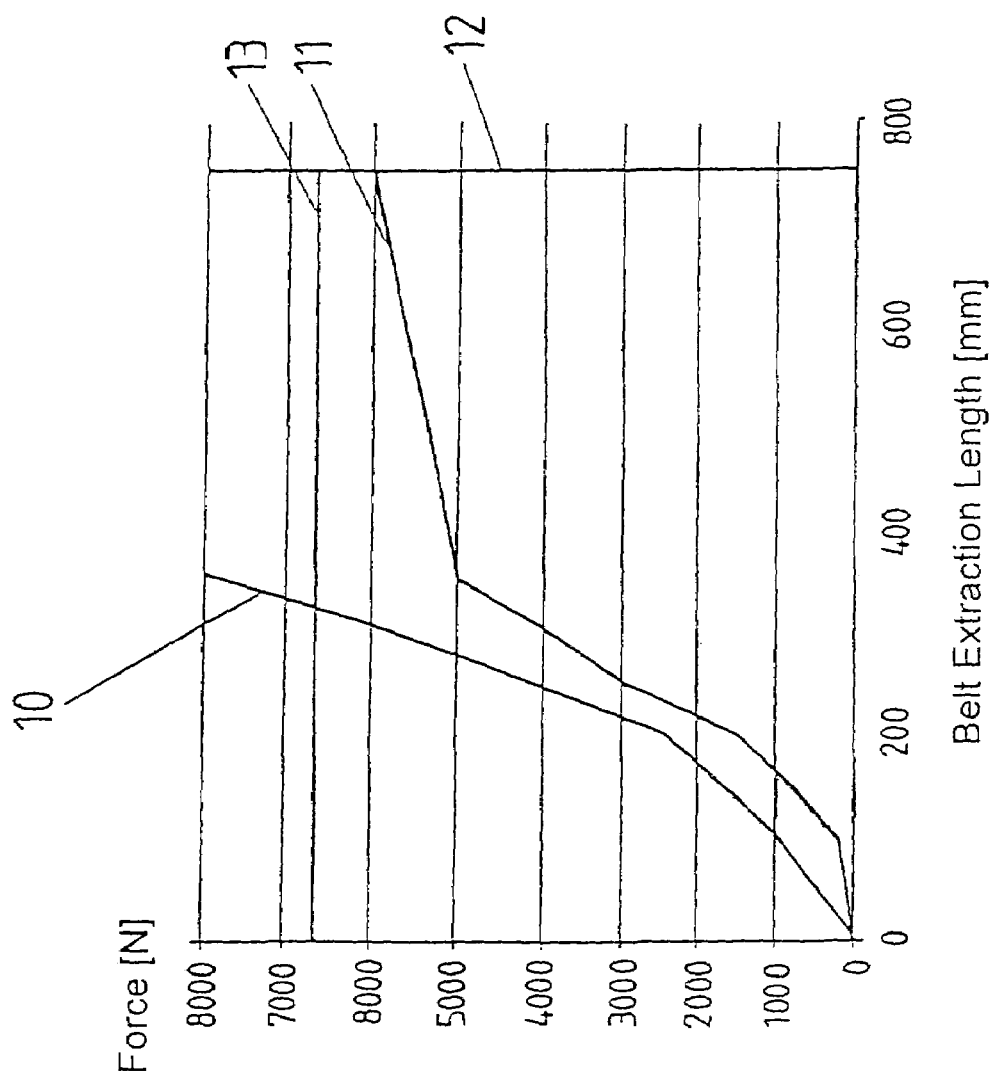
FIGS. 3 and 4 show the course of the belt extraction length depending on the belt extension force for several belt systems.

FIG. 3 shows a diagram of the belt extraction force in relation to the belt extraction length in various belt systems. Curve 10 is the curve for a belt system without any force limiting. Curve 11 is the curve for a conventional belt system with force limiting. As it can be seen, the critical belt extraction length 12 is exceeded in the conventional belt system with limiting before the critical belt force 13 is reached. In FIG. 3 the critical belt extraction length is for example about 750 mm. This length in any case can vary.

Figure 4:
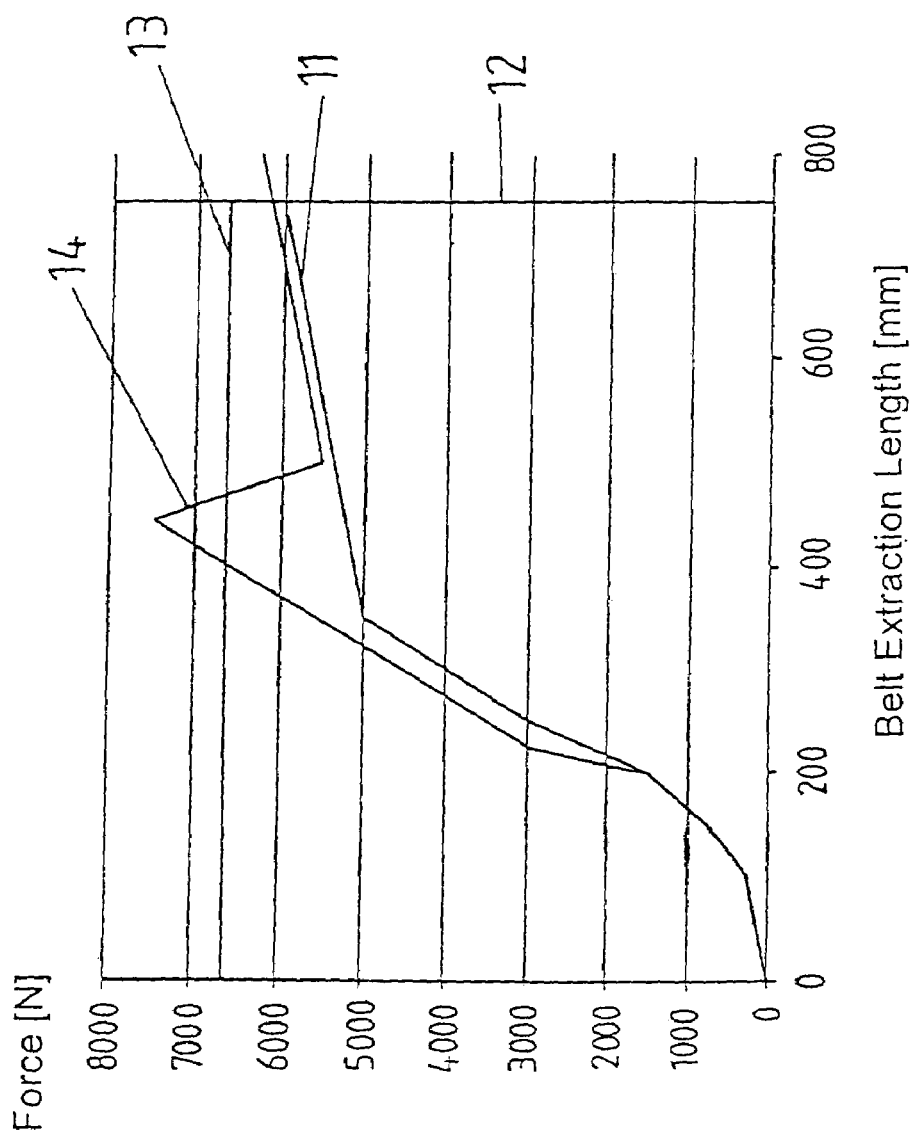

In FIG. 4 the corresponding curves for a belt system with a conventional force limiter (curve 11) and for one with a limiter according to the first embodiment of the invention (curve 14) are compared. As it can be seen, the belt extraction force exceeds the critical threshold 13 before the critical belt extraction length 12 is reached.

Figure 5:
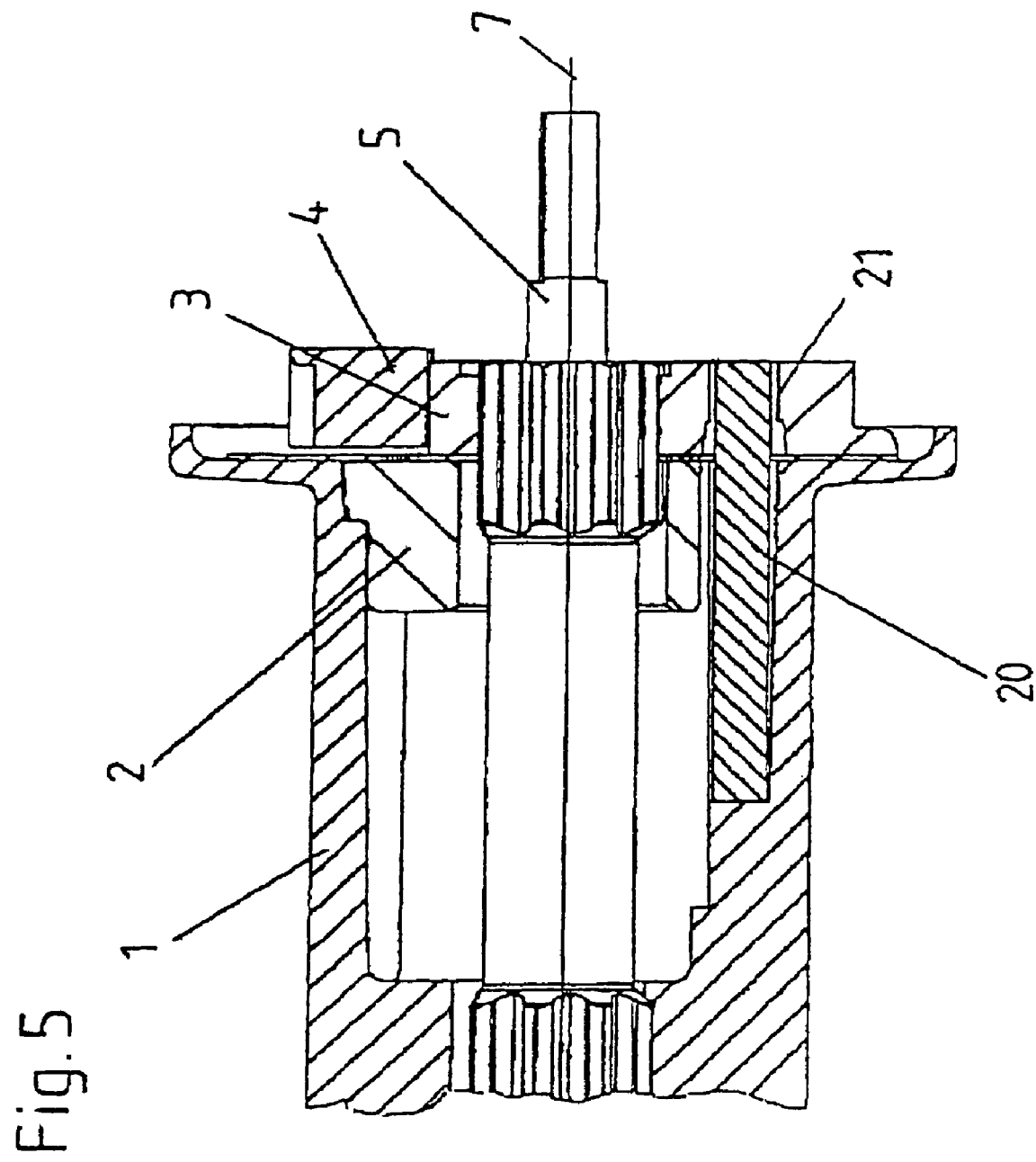
FIG. 5 is a cross sectional view through a belt force limiter according to a second embodiment of the invention.

FIG. 5 shows the cross section of a force limiter according to a second embodiment of the invention. In this embodiment, instead of the shear pin 6 of the first embodiment, a deformation pin 20 is provided. The pin 20 runs within the flange 3 in a bore 21 (see also FIG. 6).

Figure 6:
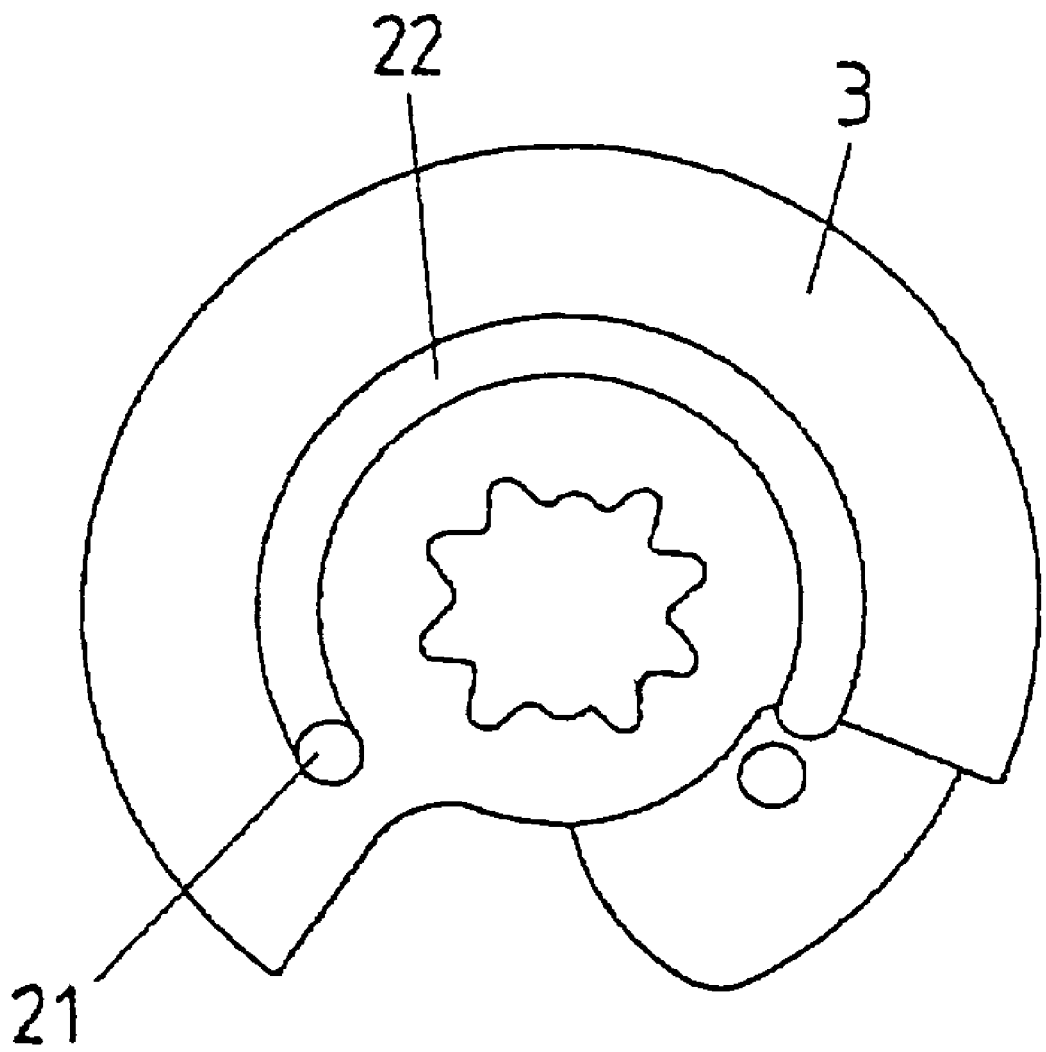
FIG. 6 is a schematic view of the bottom end of the flange of the belt force limiter of FIG. 5.

FIG. 6 shows a schematic plan view of the side of flange 3 of the second embodiment, which faces the spool 1. As stated, the flange has a bore 21 in which the one end of the pin 20 is contained. Also, a guiding slot 22, which is radially spaced from an axis of rotation of the flange 3, is provided to receive the pin 20 in case of an accident. The slot 22 is provided in a substantially circular path that runs around about two thirds of the axis of rotation of the flange 3.

As stated in regard to the first embodiment, the pawl 4 causes the flange 3 to be locked up relative to the spool 1. However, a high tension force simultaneously acts on the belt and applies a torque to the spool 1. If this torque remains under a predeterminable value, the pin 20 prevents any turning of the flange 3 and spool 1 relative to one another. If the torque exceeds this value, however, the spool 1 and the flange 3 turn relative to one another, and the pin 20 is bent out of the socket in spool 1 and forced into the slot 22.

Due to the deformation force necessary for the purpose, the belt extraction is additionally retarded initially, until after a certain relative rotation of spool 1 and flange 3 the pin is drawn completely out of the socket in spool 1 and bent into the slot 22. The pin 20 now no longer interferes with relative rotation of spool 1 and flange 3.

The relative rotation of spool 1 and flange 3 is now inhibited only by the torsion bar 5. The belt force level is therefore now determined by the torsion bar 5. This produces the desired degressive two-step belt force level.

Figure 7:
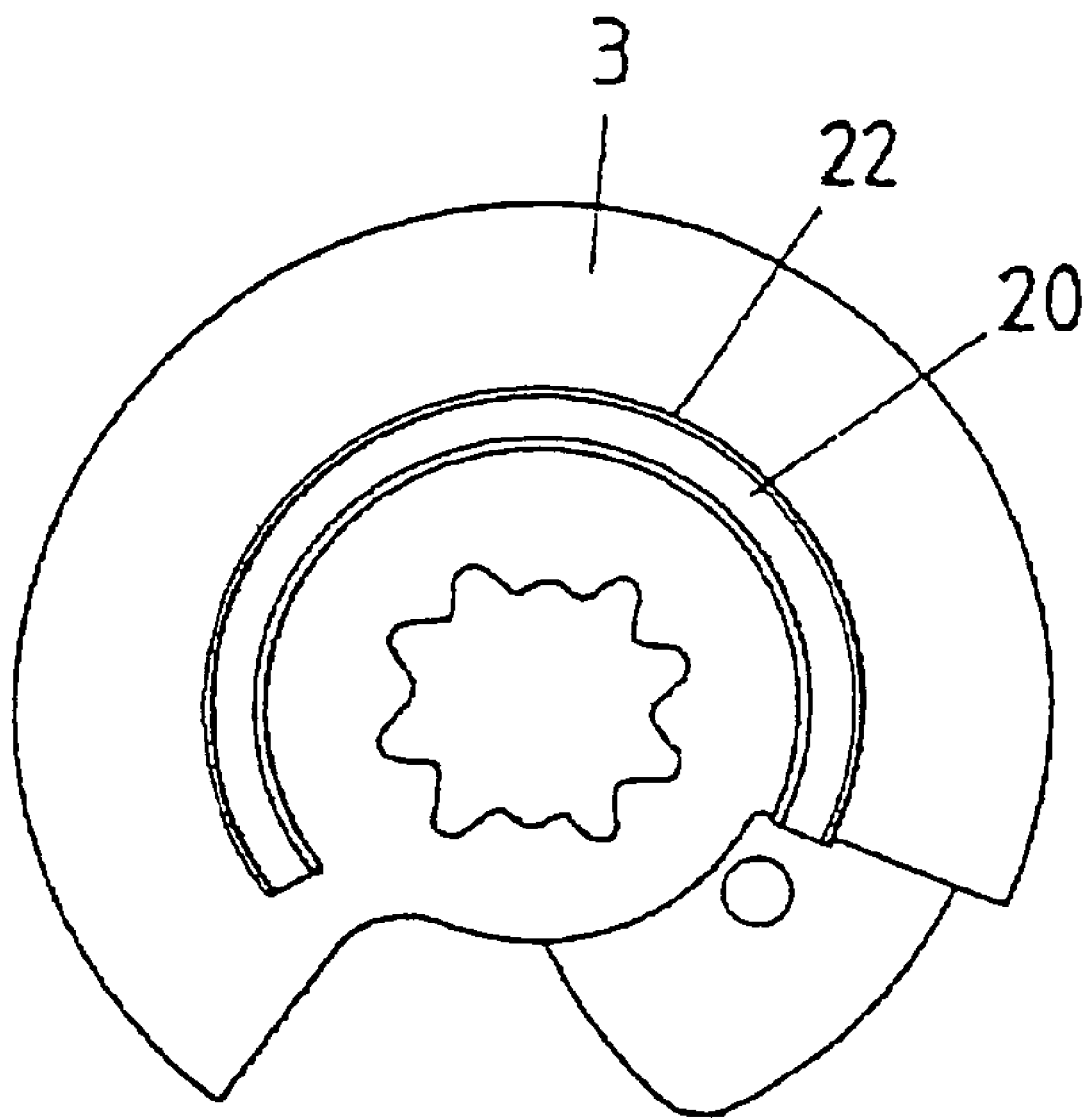
FIG. 7 is another schematic view of the bottom end of the flange with the stop pin bent away.

FIG. 7 illustrates schematically the pin 20 bent into the slot 22 of the flange 3.

Figure 8:
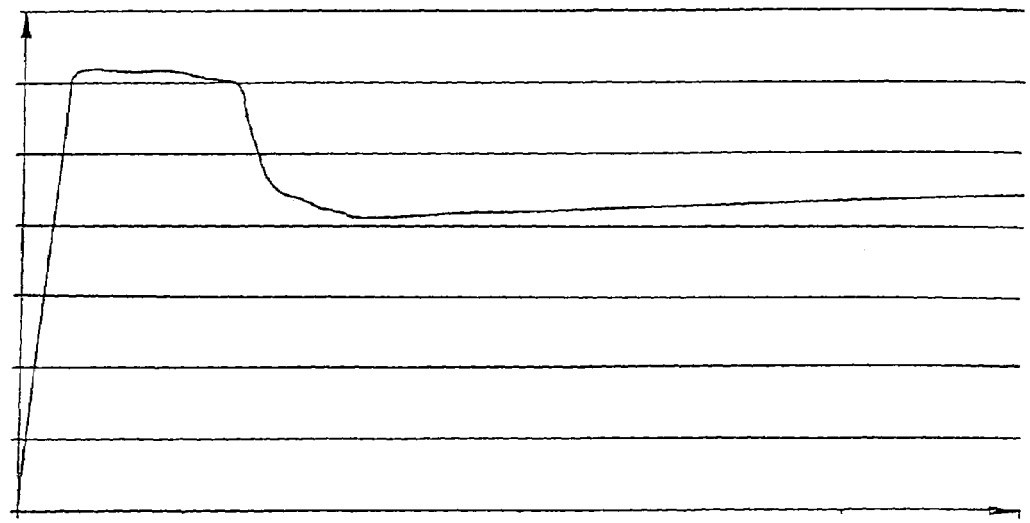
FIG. 8 is a diagram showing one possible adjustment of the belt extraction length depending on the belt force for the belt force limiter of the second embodiment.

FIG. 8 illustrates a diagram which shows the belt extraction length in relation to the belt force in the second embodiment of the belt force limiter. As it can be seen, the belt force first increases steeply and then remains for a moment at a higher level. This level of force is determined by the extraction and bending of the pin 20. The curve of this level of force depends directly on the cross section of the unbent deformation pin and therefore can be affected by the configuration of this cross section along its length.

Then the belt force drops to a low level. This level is determined by the twisting of the torsion bar 5.

Figure 9:
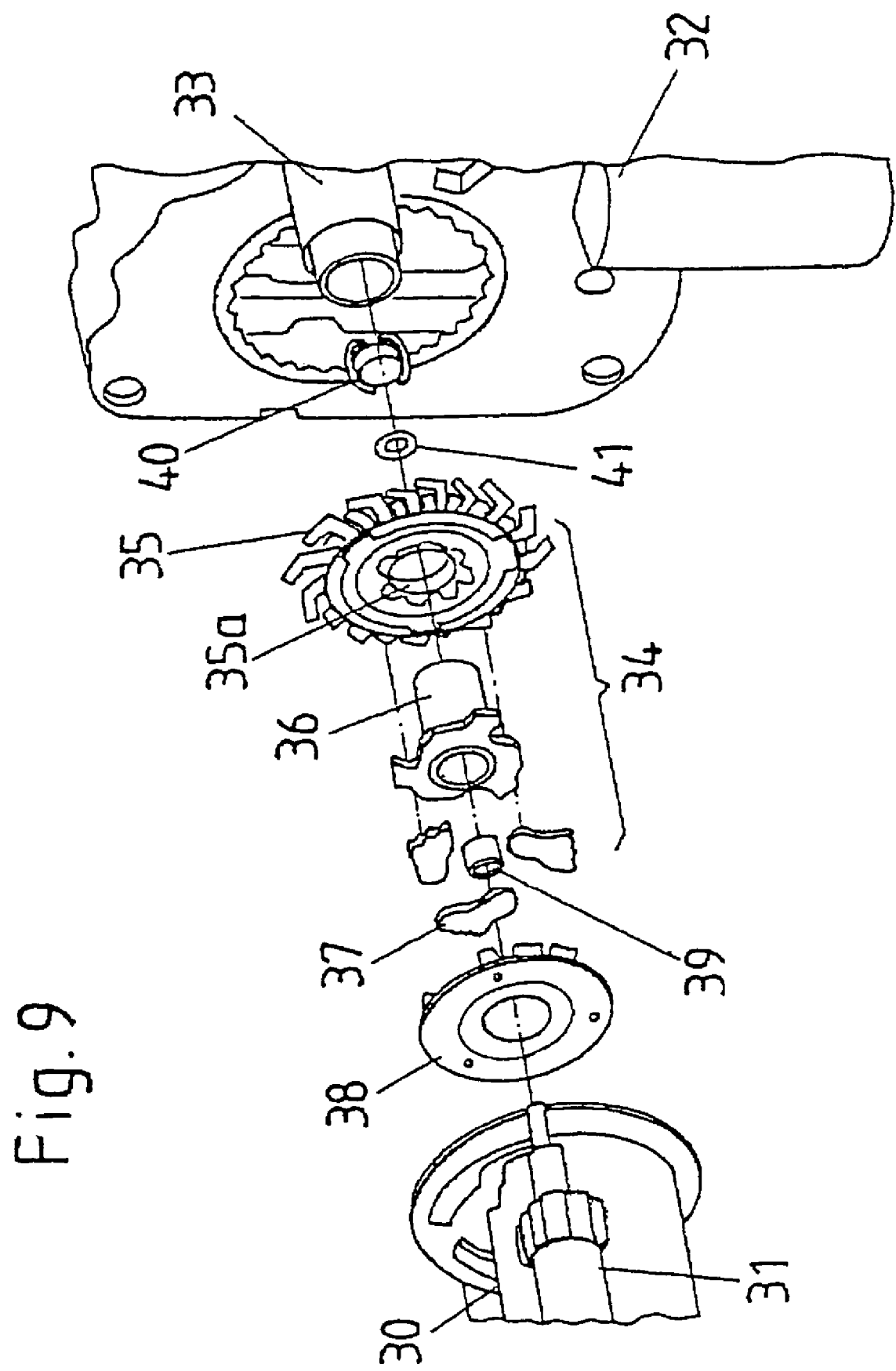
FIG. 9 is a perspective view of a disassembled belt device according to a third embodiment of the invention.

FIG. 9 shows a perspective view of the parts of a belt device according to a third embodiment of the invention. The belt device has a belt spool 30 to which one end of a torsion bar 31 is fastened. The other end of the torsion bar is fastened to a locking device on the vehicle 32, which in the event of an accident locks the other end of the torsion bar in a manner similar to the first two embodiments.

Between the belt spool 30 and a shaft 33 a clutch 34 is provided, which consists of a guiding ring 35, a coupling element 36 and dogs 37. Also, a cover 38, bearings 39 and 40, and a seal 41 are also provided.

The shaft 33 serves to transmit a rotational force of a belt tightener (not shown), to the belt spool 30.

Figure 10:
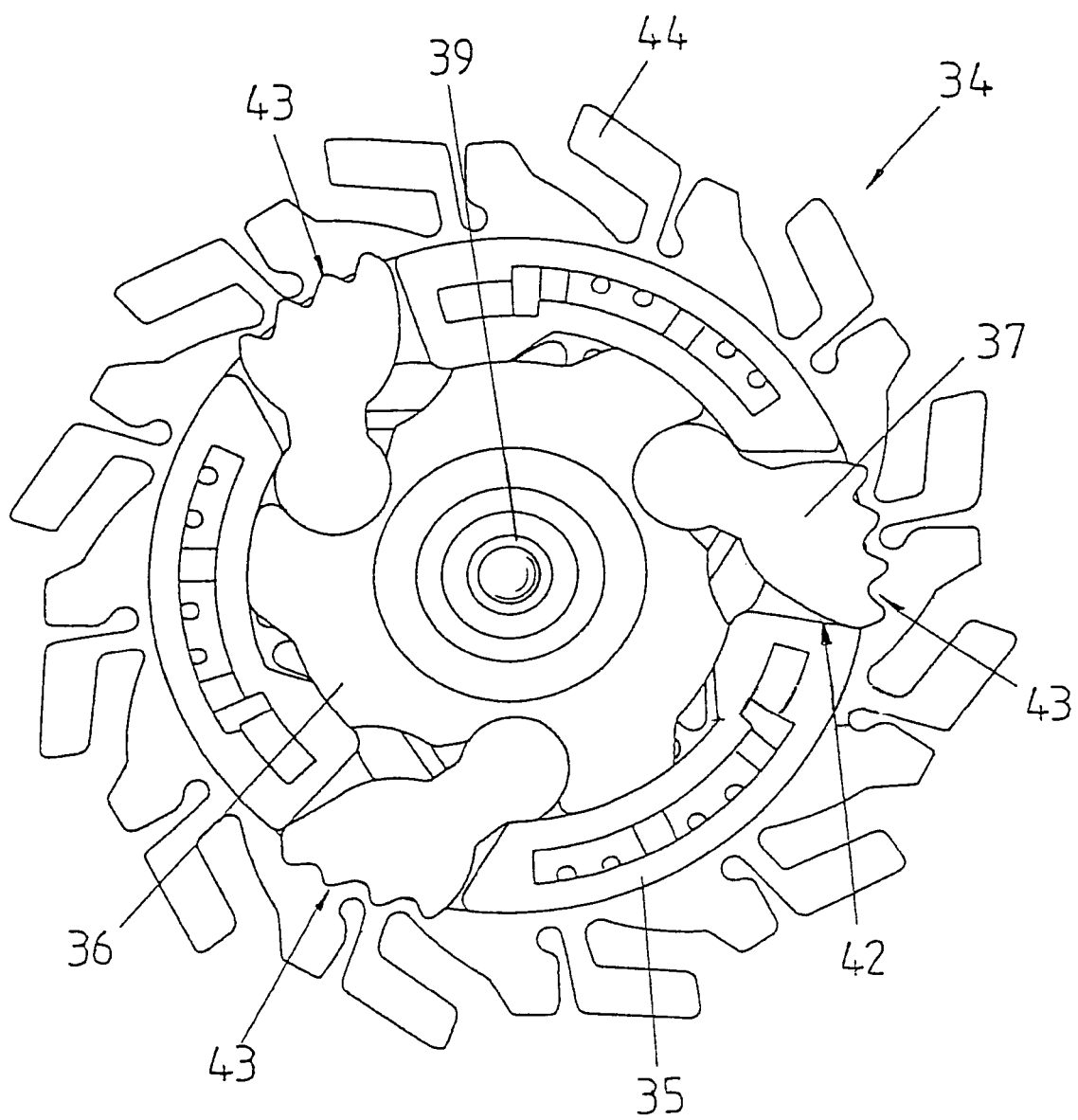
FIG. 10 is a clutch of the belt device from FIG. 9.

FIG. 10 shows the clutch 34 in a frontal view. The dogs (also referred to as "clutching elements" or "clutching means") 37 are articulated on the coupling element 36. Also, the dogs 37 are guided within guiding slots 42 in the guiding ring 35. The clutching elements 37 have outwardly facing serrated surfaces 43.

The guiding ring 35 also has lugs 44 on its perimeter, which when the guiding ring 35 rotates counter-clockwise engage in recesses 45 provided for the purpose on the vehicle 32, as described below.

The coupling element 36 is affixed to the guiding ring 35. A portion 35a (FIG. 9), in which the coupling element is fastened to the guiding ring, is resilient with respect to the rest of the guiding ring 35. This area passes around the center of the guiding ring 35.

On account of the elasticity of the central portion 35a of the guiding ring 35, the shaft 33 as well as the coupling element 36 fastened to the shaft 33 can be rotated slightly with respect to the outer circumferential area in which the guiding slots 42 are located. This means that a rotation of shaft 33 is not directly transferred to the outer circumferential area of the guiding ring 35, but initially only to the resilient central portion 35a.

Figure 11:
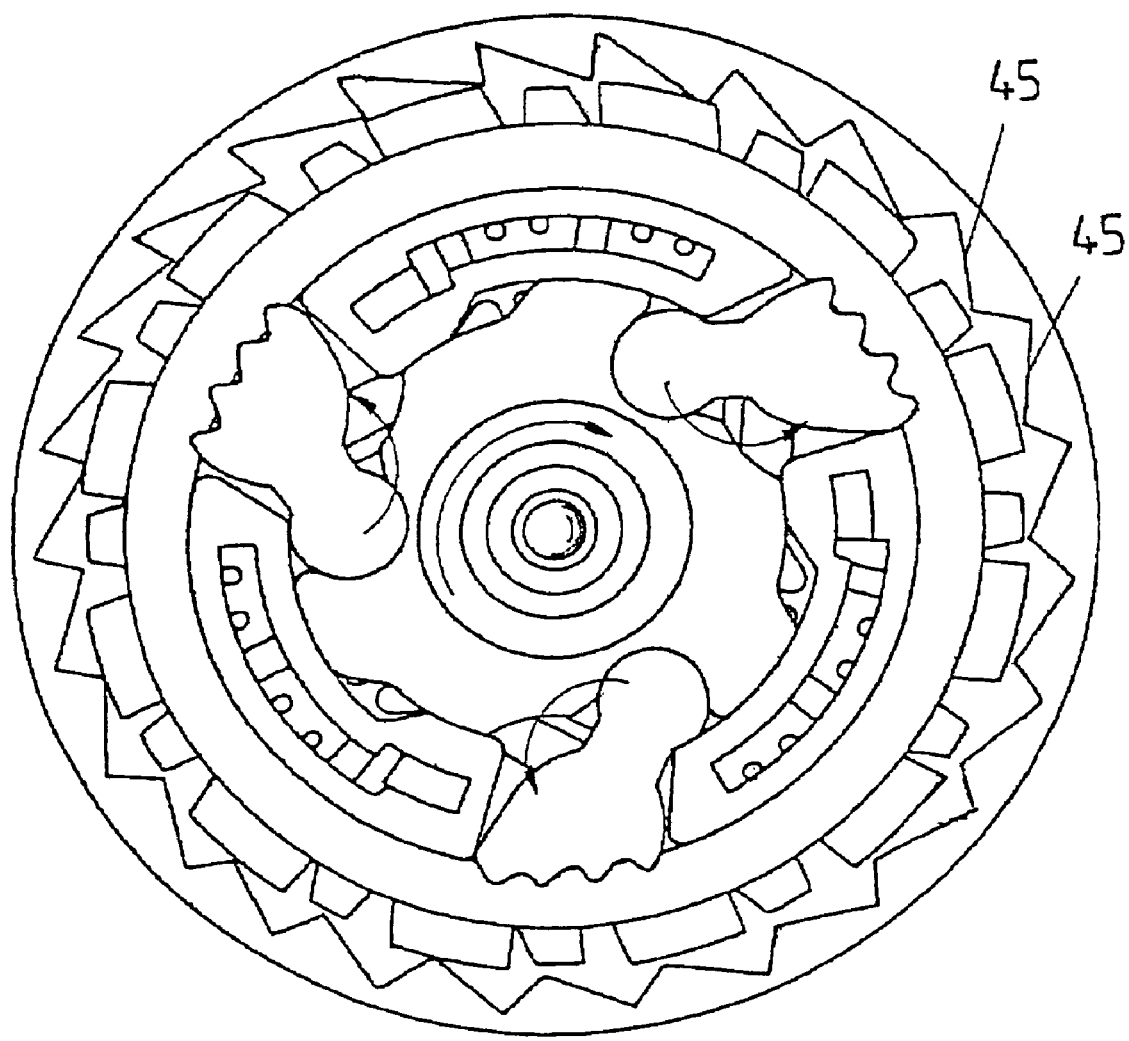
FIG. 11 shows the clutch from FIG. 10 when the belt tightener is actuated.

In the view presented in FIG. 10, a belt tightening is produced by clockwise rotation of shaft 33. A clockwise rotation of shaft 33 produces an initial rotation of the coupling element 36 with respect to the outer circumferential portion of the guiding ring 35. Due to the articulation of the clutching elements 37 on the coupling element as well as their guidance within the guiding slots 42, the latter are thereby moved radially outwardly. This is indicated schematically in FIG. 11 by arrows. The serrated, outwardly facing surfaces 43 then engage the inner circumferential surface of the belt spool 30 and create a tensional coupling between the shaft 33 and the belt spool 30.

The belt spool 30 is rotated by the shaft 33 until the detonating charge by which the shaft 33 is driven is exhausted. This tightens the belt.

Figure 12:
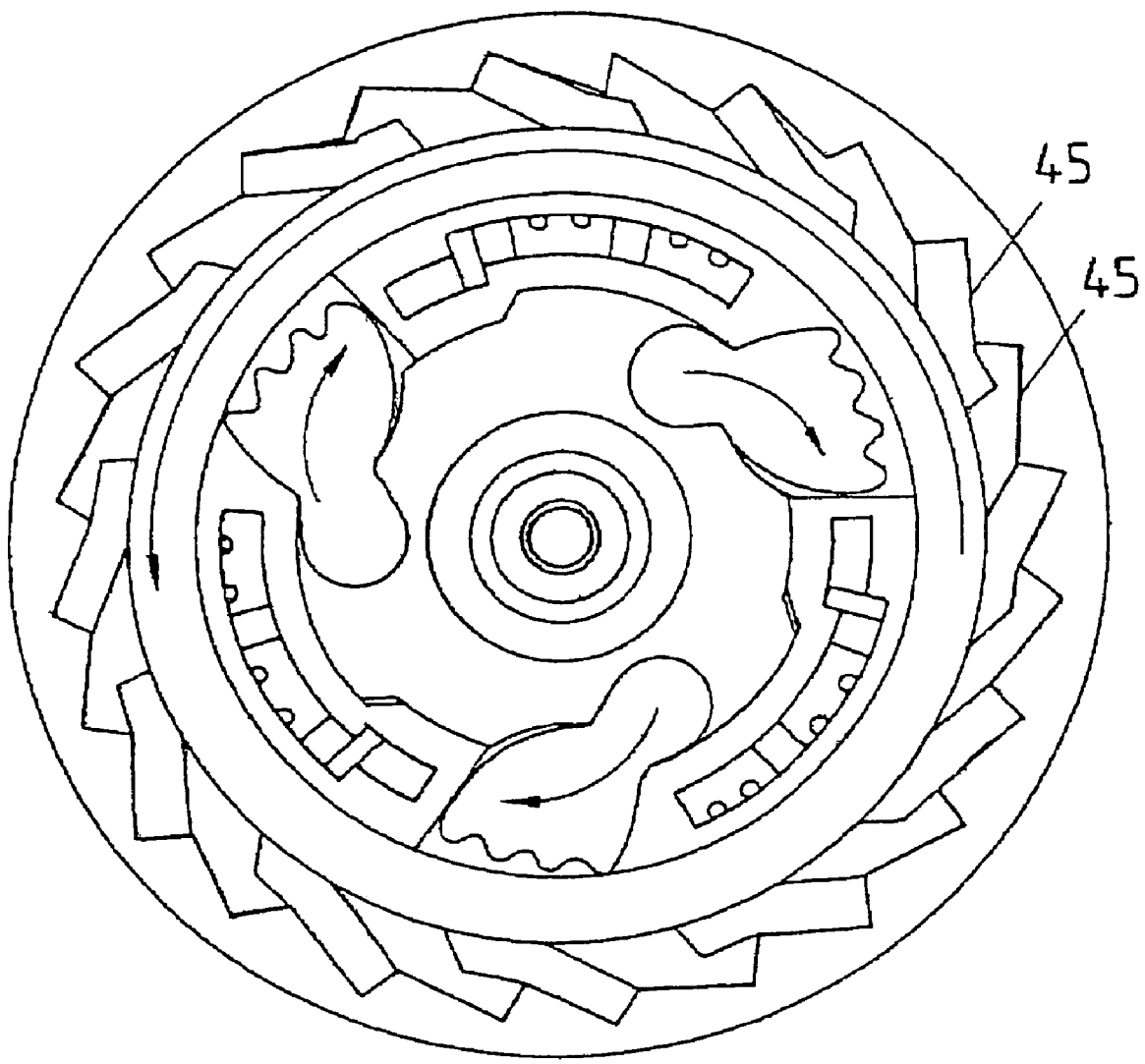
FIG. 12 shows the clutch from FIG. 10 with the belt force limitation actuated.

Then a vehicle occupant plunging into the belt produces a force on the belt spool 30 which produces a counter-rotation. Due to the frictional coupling of the belt spool 30 to the guiding ring by means of the clutching means 37, the guiding ring 35 is also given an opposite (counterclockwise) rotation. This is indicated schematically by an arrow in FIG. 12.

The lugs 44 thus enter the recesses 45 on the vehicle. Any further counterclockwise rotation of the guiding ring 35 is thus blocked. Since the lugs 44 are still engaged, a positive connection to the belt spool 30 still exists and a rotational force is still acting on the coupling element 36. If this rotational force reaches a predetermined level, the elastic inner area 35a rotates with respect to the outer circumferential area of the guiding ring 35, so that the serrated surfaces 43 fall away from the belt spool 30 and the clutching means 37 are carried radially inward within the guiding slots 42.

After the positive coupling between the belt spool 30 and the guiding ring 35 is released, the belt force falls to a lower level and is determined by the torsion bar, as described above.

Figure 13:
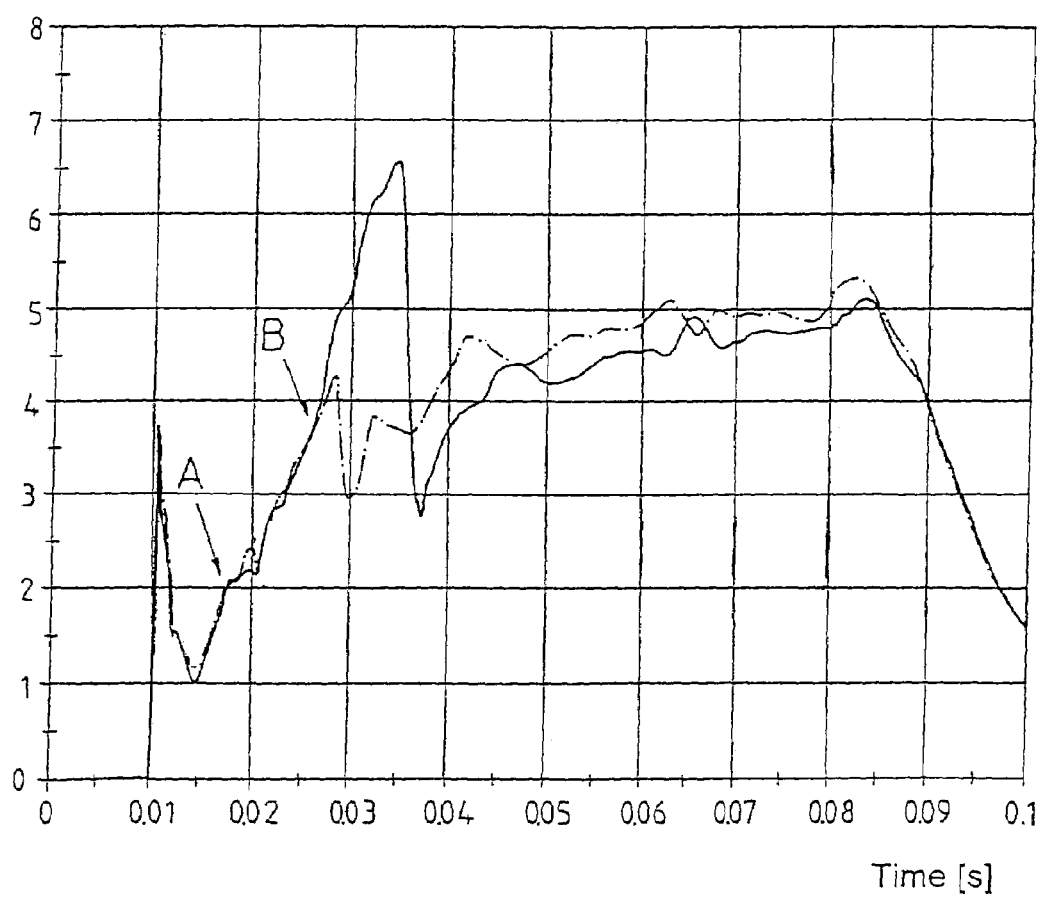
FIG. 13 shows the result of a test to show the method of the invention.

FIG. 13 shows the result of an experimental test which was achieved with a dynamic sled which was driven at a velocity of about 55 km/h. In the diagram the force measured in the belt (shoulder force) is represented over time. The 3-point safety seat belt used comprised a belt winder, a belt tightener and a device for limiting the belt force.

The dash-dotted curve in FIG. 13 represents the force curve with only a slight overload, whereas the curve represented by the solid line shows the belt force with a strong overload, i.e., with a deliberate brief and relatively high gradient. According to the invention, a defined increase in the belt force is produced very early, i.e., about 25 ms after the collision begins. This moment in time is situated shortly after the tightening action produced by the belt tightener, which occurs about 15–20 ms after the collision begins. The rise of the belt force indicated by the arrow A in FIG. 13 is started by the conventional seat belt tightening process. The force increase immediately following, which is indicated by the arrow B, allows the belt force to increase to a level of about 4.25 and 6.5 kN, respectively, and then a reduction of the belt force to a level of about 3 kN takes place. This lower force level corresponds to the actual force level of the energy absorption system in the form of a torsion bar. With this system for limiting the force a gradual increase then follows, to an approximately constant level of about 4.5 kN.

As FIG. 13 shows, the peak shoulder force according to the invention starts about 25 ms after the collision begins, and lasts for about 30 to 37 ms thereafter.

Then the belt force changes to a substantially constant level ranging from about 4.5 to 5 kN.

Figure 14:
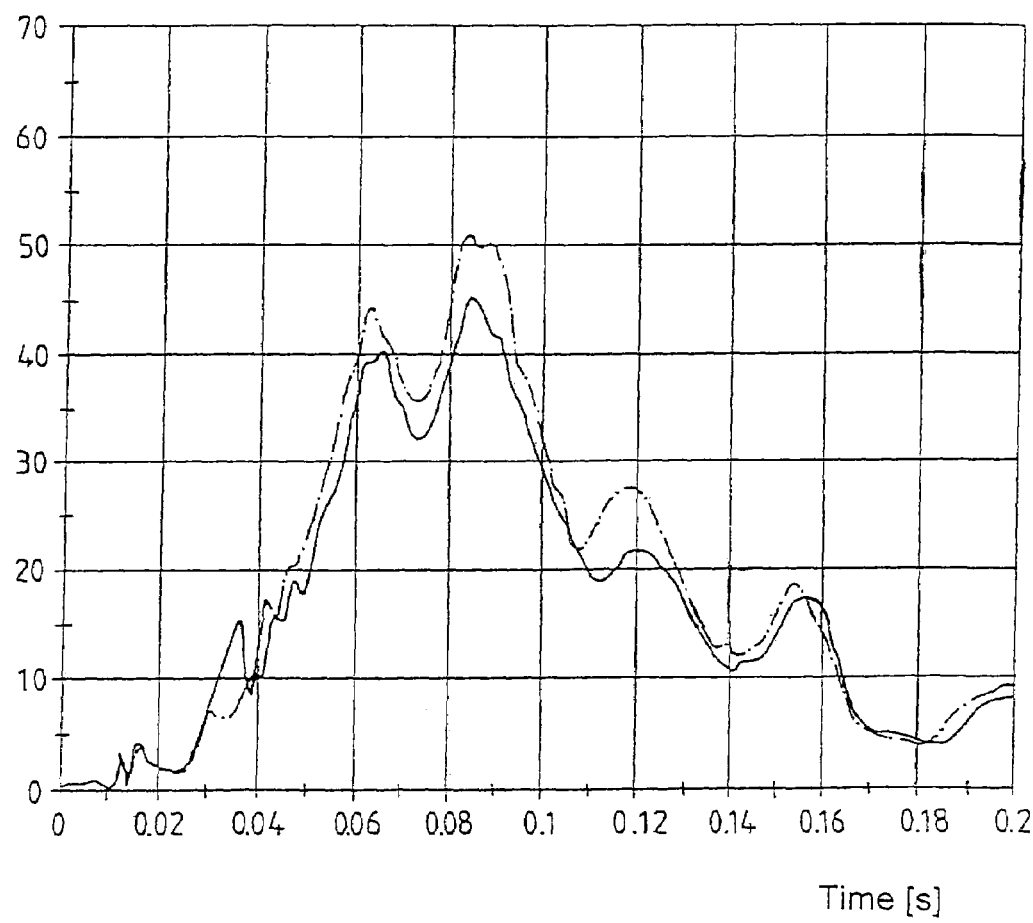
FIG. 14 shows the head accelerations on a test dummy's head.

FIG. 14 shows the head accelerations achieved in the experimental test of FIG. 13, which were measured on a dummy test head. As it can be seen, due to the strong overload occurring at an earlier point in time (solid line) the belt force, compared with a less strong overload (dash-dotted line), achieves at a later moment in time a great reduction of the head acceleration. In the examples represented, at about 85 ms a reduction of about 5 g in the head acceleration is achieved.

The method of the invention can be practiced with the aid of a clutch which can open under load, while due to the opening force necessary for release can be set at the level of the desired peak force.

In the case of the system according to the invention, a clutch is provided within the belt winder between the belt tightening drive and the belt spool. At the end of the belt tightening action, this clutch is activated by operating a switch element, so that the belt force increases as desired (area B in FIG. 13). Depending on the design of the clutch, a lesser increase (dash-dotted line) or a stronger increase (solid line) of the belt force can be achieved. Not until the belt force has risen so high that the clutch opens completely does a reduction of the belt force occur, since the belt spool is then fully uncoupled from the tightening drive. The belt force then drops to the level of the system for belt force limitation, i.e., the force exerted on the belt causes the belt to unwind from the spool, so that the torsion bar is twisted between the spool and the frame.

It is to be noted that the invention is not limited to the embodiments described, but that it includes modifications within the scope of the protection established by the claims.

What is claimed is:

1. A belt force limiter for a vehicle, comprising:
   a rotatable spool for winding and unwinding a belt;
   a torsion bar which is fastened at one end to the spool and at the other end is mounted for rotation on the vehicle;
   a locking device to block rotation of the torsion bar;
   a pin for releasably inhibiting a rotation of the spool;
   a flange which is attached to the spool and which is adapted to rotate with and relative to the spool,
   wherein the torsion bar is attached at one end to the spool and at the other end to the flange,
   wherein the locking device is adapted to block rotation of the flange,
   wherein the pin is positioned in a cavity and releasably inhibits rotation of the spool relative to the flange, and
   wherein the flange includes a curved slot, which runs substantially around an axis of rotation of the flange, for accommodating the pin.

2. A belt force limiter for a vehicle, comprising:
   a rotatable spool for winding and unwinding a belt;
   a torsion bar which is fastened at one end to the spool and at the other end is mounted for rotation on the vehicle;
   a locking device to block rotation of the torsion bar;
   a pin for releasably inhibiting a rotation of the spool; and
   a flange which is attached to the spool and which is adapted to rotate with and relative to the spool,
   wherein the pin is configured such that its inhibiting action on the spool can be canceled by the exceeding of a predetermined torque beyond a predetermined belt extraction length with simultaneous blockage of the flange rotation,
   wherein the flange includes a curved slot for accommodating the pin, and
   wherein the slot runs substantially around an axis of rotation of the flange.

3. The belt force limiter according to claim 2, wherein the pin is deformable, and wherein upon the application of the predetermined torque to the spool a turning of the spool relative to the flange can be started, whereby the deformable pin is forced into the slot in the flange, bent, and drawn out of a cavity, thereby canceling the inhibition of the rotation of the spool relative to the flange.

4. The belt force limiter of claim 3, wherein the slot is radially spaced from an axis of rotation of the flange.

5. A belt force limiter for a vehicle, comprising:
   a rotatable spool for winding and unwinding a belt;
   a torsion bar which is fastened at one end to the spool and at the other end is mounted for rotation on the vehicle;
   a locking device to block rotation of the torsion bar;
   a pin for releasably inhibiting a rotation of the spool; and
   a flange which is attached to the spool and which is adapted to rotate with and relative to the spool,
   wherein the pin is configured such that its inhibiting action on the spool can be canceled by the exceeding of a predetermined torque beyond a predetermined belt extraction length with simultaneous blockage of the flange rotation,
   wherein the pin is deformable, and wherein upon the application of the predetermined torque to the spool a turning of the spool relative to the flange can be started, whereby the deformable pin is forced into a slot in the flange, bent, and drawn out of a cavity, thereby canceling the inhibition of the rotation of the spool relative to the flange,
   wherein the slot is radially spaced from an axis of rotation of the flange, and
   wherein the slot runs substantially semi-circularly around the axis of rotation of the flange.

* * * * *